(12) United States Patent
West (10) Patent No.: US 8,348,191 B2
(45) Date of Patent: Jan. 8, 2013

(54) FAIL-SAFE AIRCRAFT ENGINE MOUNTING APPARATUS

(75) Inventor: Randall Ray West, Wichita, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 252 days.

(21) Appl. No.: 12/836,197

(22) Filed: Jul. 14, 2010

(65) Prior Publication Data

US 2012/0012694 A1    Jan. 19, 2012

(51) Int. Cl.
*B64D 27/26* (2006.01)
(52) U.S. Cl. .......................................... 244/54
(58) Field of Classification Search ............... 244/53 R, 244/54; 248/554
See application file for complete search history.

(56) References Cited

U.S. PATENT DOCUMENTS

| 2,818,225 | A | * | 12/1957 | Kent ............................. 244/54 |
| 3,006,587 | A | | 10/1961 | Jumelle et al. |
| 3,675,418 | A | * | 7/1972 | Lenkeit et al. .................. 244/54 |
| 3,809,340 | A | | 5/1974 | Dolgy et al. |
| 3,844,115 | A | * | 10/1974 | Freid .............................. 244/54 |
| 4,065,077 | A | | 12/1977 | Brooks |
| 4,326,682 | A | | 4/1982 | Nightingale |
| 5,927,644 | A | | 7/1999 | Ellis et al. |
| 6,059,227 | A | | 5/2000 | Le Blaye et al. |
| 6,309,131 | B1 | * | 10/2001 | Dawson .......................... 244/54 |
| 6,401,448 | B1 | | 6/2002 | Manteiga et al. |
| 6,474,596 | B1 | | 11/2002 | Cousin et al. |
| 6,607,165 | B1 | | 8/2003 | Manteiga et al. |
| 6,843,449 | B1 | | 1/2005 | Manteiga et al. |
| 7,267,301 | B2 | | 9/2007 | Dron |
| 2005/0269446 | A1 | | 12/2005 | Dron |
| 2007/0246603 | A1 | | 10/2007 | Udall et al. |

FOREIGN PATENT DOCUMENTS

GB    2010969 A  *  7/1979

* cited by examiner

*Primary Examiner* — Tien Dinh
*Assistant Examiner* — Richard R Green
(74) *Attorney, Agent, or Firm* — Hovey Williams LLP (57) ABSTRACT

A mounting apparatus for an aircraft engine that provides load path redundancy includes a forward mount that attaches the aircraft engine to a pylon at a forward position of the aircraft engine, an aft mount that attaches the aircraft engine to the pylon at an aft position of the aircraft engine and a thrust assembly connected to the forward mount, and the aft mount. The forward mount includes an aircraft engine attachment assembly and a fail-safe assembly. The aft mount includes an aircraft engine attachment assembly and a fail-safe assembly.

20 Claims, 10 Drawing Sheets

FAIL-SAFE AIRCRAFT ENGINE MOUNTING APPARATUS

BACKGROUND OF THE INVENTION

1. Field of the Invention

The present invention relates to aircraft engine mounts. More particularly, the invention relates to turbofan engine mounts that provide fail-safety.

2. Description of the Prior Art

Aircraft engines are commonly mounted to an aircraft's wings, fuselage, or tail by an aircraft engine mounting apparatus that connects to the end of a mounting structure, such as a pylon. The engine mounting apparatus must be able to withstand vertical loads, such as gravity, horizontal loads, such as the thrust of the aircraft engine, lateral loads, such as wind buffeting, and axial loads, such as the rotational force of the aircraft engine. Additionally, the aircraft engine mounting apparatus must accommodate thermal expansion and contraction of the engine case. Due to the extreme forces exerted on aircraft engine mounting apparatus, it is imperative that failure of a part of the aircraft engine mounting apparatus does not cause loss of an engine.

Some prior art aircraft engine mounting apparatuses have fail safety mechanisms, but such mechanisms are heavy and complex and are sometimes installed incorrectly, or in the wrong location or orientation.

SUMMARY OF THE INVENTION

The present invention solves the above-described problems and provides a distinct advance in the art of engine mounting apparatuses. More particularly, the present invention provides an aircraft engine mounting apparatus that is failsafe, allows for installation on a right or a left side of an aircraft using the same parts, and is integrated into the primary load path to reduce weight.

An aircraft engine mounting apparatus constructed in accordance with an embodiment of the invention is operable to mount to a pylon on a side of an aircraft and broadly includes a forward mount assembly, a thrust assembly, and an aft mount assembly. The forward mount assembly includes a main body, a yoke assembly and a link assembly. The yoke assembly includes a mounting plate, a lower attachment assembly, a link attachment assembly, and a link assembly. The yoke assembly also includes a spaced-apart walls that define a channel for receiving the thrust fitting assembly therein and further includes a pin-receiving hole for securing the thrust link assembly. The link assembly attaches to the yoke assembly and to a feature of the aircraft engine and facilitates thermal expansion of the aircraft engine. The thrust assembly includes a thrust fitting assembly and a thrust link assembly. The thrust fitting assembly includes a base member, a thrust link tongue, a thrust-fitting flange, and an engine flange. The thrust link assembly includes an elongated bar with attachment assemblies on its distal ends for securing the thrust fitting assembly to the aft mounting assembly. The aft mount assembly includes a base member, flanges, and a pair of engine-link assemblies. The flanges of the aft mount assembly are spaced-apart to define a channel, like a clevis. Each engine-link assembly attaches the aft mount assembly to a feature of the aircraft engine.

Another embodiment of an aircraft engine mounting apparatus is operable to mount to a pylon under a wing of an aircraft and broadly includes a forward mount assembly, a thrust assembly, and an aft mount assembly. The forward mount assembly includes a main body, a pin, and a clevis. The main body includes a base member and a longitudinal raised knuckle. The pin transmits load forces between the aircraft engine and the forward mount. The thrust assembly includes a thrust fitting assembly and a thrust link assembly. The thrust fitting assembly includes a base member, a thrust link tongue, a thrust-fitting flange, and an engine flange. The thrust link assembly includes an elongated bar with attachment assemblies on its distal ends for securing the thrust fitting assembly to the of mounting assembly. The aft mount assembly includes a base member, flanges, and a pair of engine-link assemblies. The flanges of the aft mount assembly are spaced-apart to define a channel, like a clevis. Each engine-link assembly attaches the aft mount assembly to a feature of the aircraft engine.

This summary is provided to introduce a selection of concepts in a simplified form that are further described below in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Figure 1:
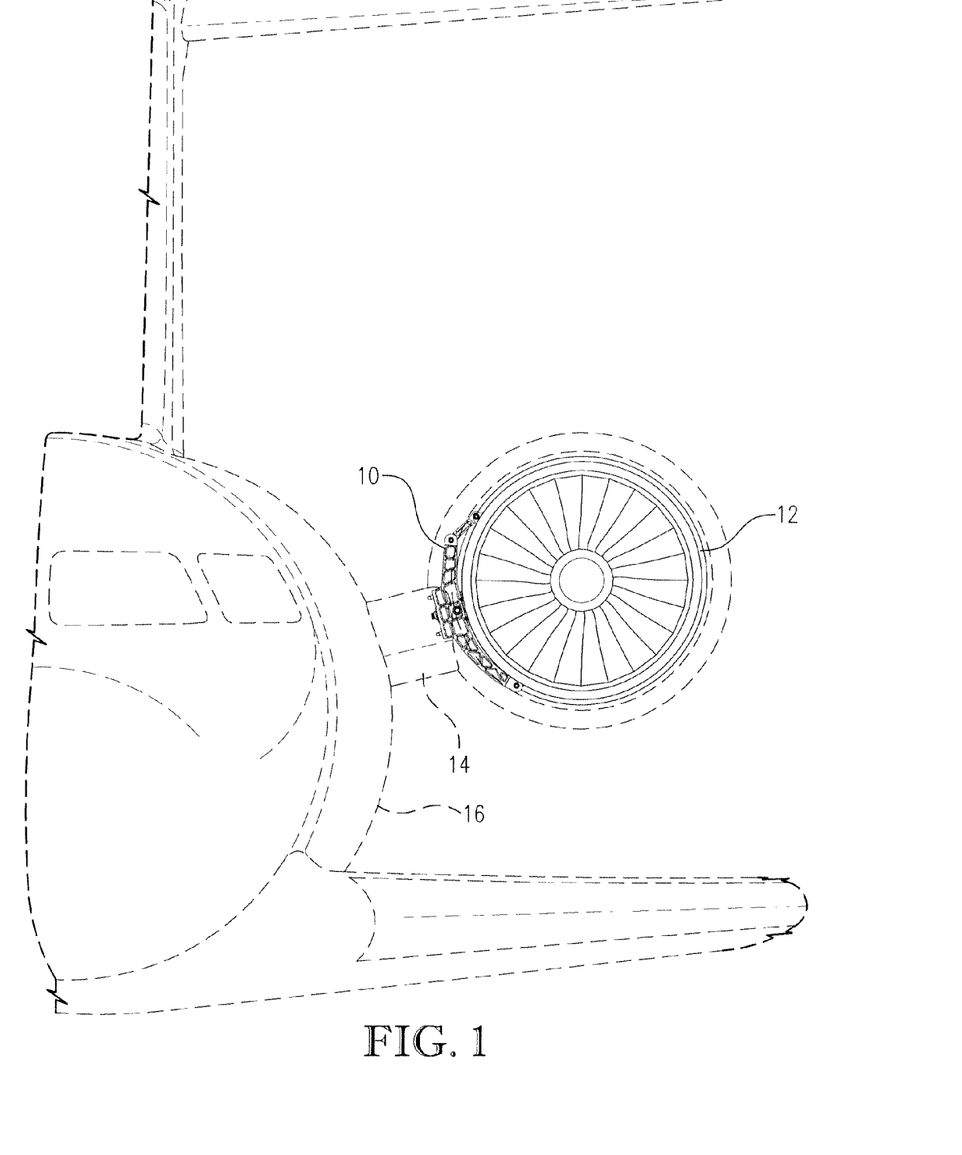
FIG. 1 is an elevation view of an aircraft engine mounting apparatus installed on a side of an aircraft fuselage in accordance with one embodiment of present invention.
Figure 2:
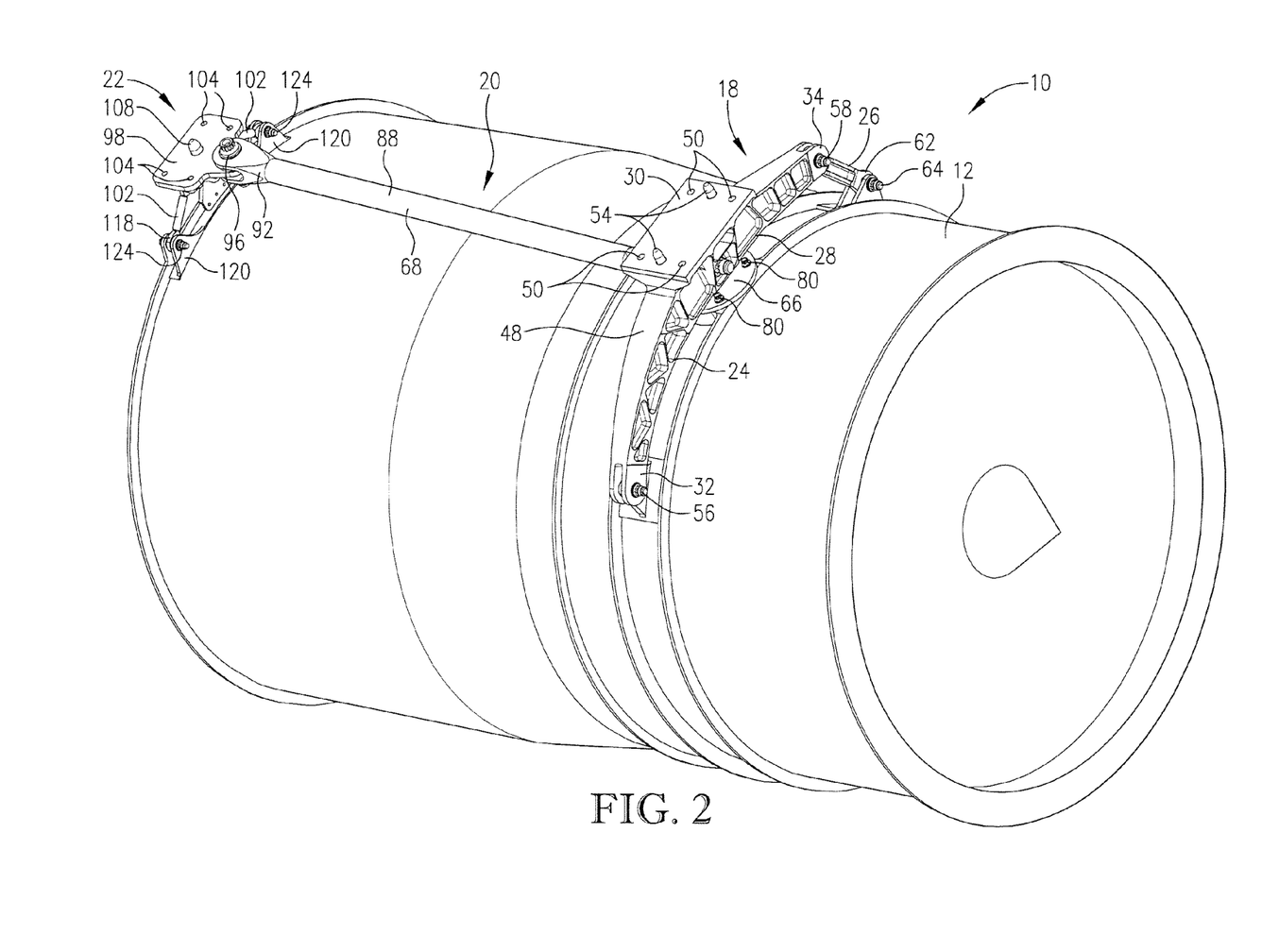
FIG. 2 is an isometric view of the aircraft engine mounting apparatus attached to an aircraft engine.
Figure 3:
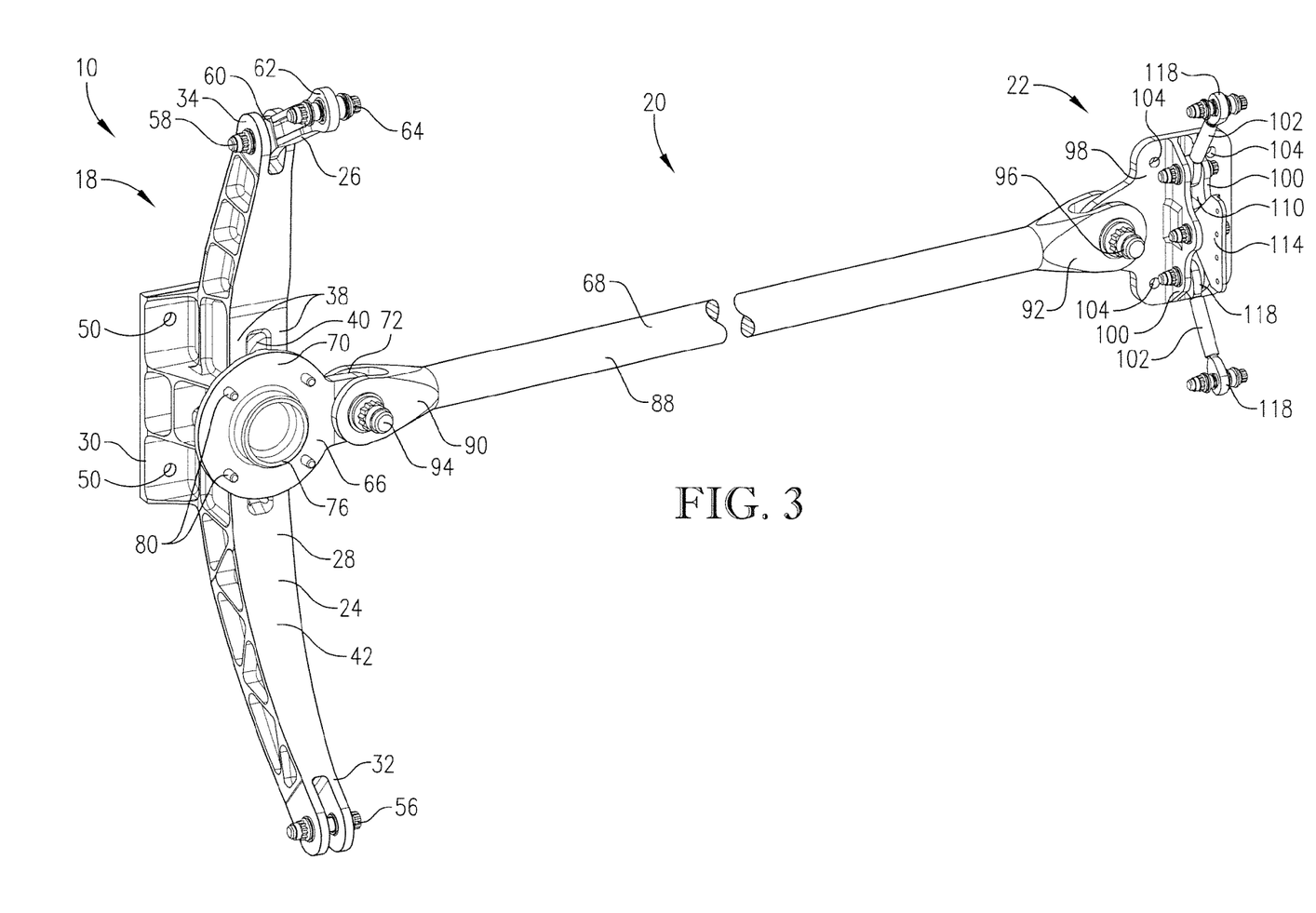
FIG. 3 is an isometric view of the aircraft engine mounting apparatus.
Figure 4:
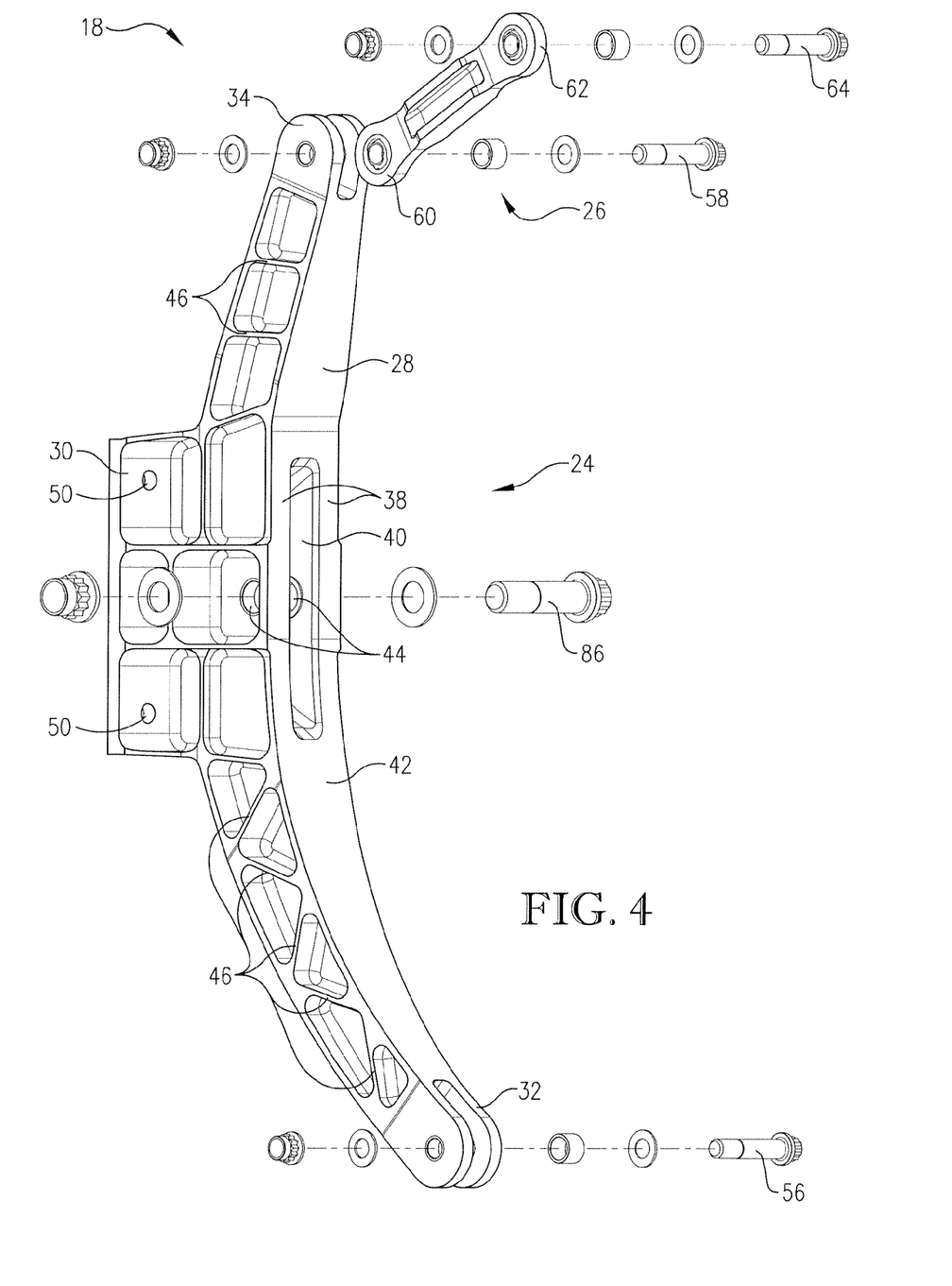
FIG. 4 is an isometric view of the forward mount assembly of the aircraft engine mounting apparatus.

Turning now to the drawing figures, and initially FIGS. 1-3, an aircraft engine mounting apparatus 10 constructed in accordance with an embodiment of the invention is illustrated. The aircraft engine mounting apparatus 10 attaches to an aircraft engine 12 and to a pylon 14 that is attached to a side of an aircraft 16. The aircraft engine mounting apparatus 10 is operable to provide load path redundancy and fail-safety, and broadly includes a forward mount assembly 18, a thrust assembly 20, and an aft mount assembly 22. As best shown in FIGS. 2, 3 and 4, the forward mount assembly 18 attaches to the aircraft engine 12 at a forward location and broadly includes a yoke assembly 24 and a link assembly 26.

The yoke assembly 24 includes a generally arcuate-shaped main body 28, a mounting plate 30 attached to the main body 28, a lower attachment assembly 32 formed in one end of the main body 28, and a link attachment assembly 34 formed in an opposite end of the main body 28. The main body 24 may be formed of metal, composite material, or the like, and includes a spaced-apart walls 38 forming a channel 40 on its concave side 42 for receiving components of the thrust assembly 20 therein. Each of the walls 38 includes a pin-receiving hole 44 therethrough for securing the thrust assembly 20 within the forward mount assembly 18 so that a fastener 86 (later described herein) inserted therethrough will not vibrate therein. The main body 28 may include various reinforcing features 46 to improve its strength or stiffness.

The mounting plate 30 extends along a medial portion of the convex side 48 of the main body 28 to removably attach the forward mount assembly 18 to the pylon 14 of the aircraft 16. The mounting plate 30 may be square, rectangular, round, or various other shapes and it may include reinforcing members in various configurations to strengthen or stiffen the mounting plate 30, as necessary. The mounting plate 30 may include holes 50 to secure the forward mount assembly 18 to the pylon with a fastener (not shown), such as screws, bolts, pins, or the like. Additionally, the mounting plate 30 may include various protrusions, depressions, or the like, such as pin 54, operable to matingly engage with various complementary features of the pylon 14.

The lower attachment assembly 32 pivotally connects the yoke assembly 24 to a flange or other attachment point on the aircraft engine 12. The lower attachment assembly 32 may be a clevis, lug, ball joint, rod end, or the like, that may be secured to a flange or other attachment point of the aircraft engine 12 with a fastener 56, such as a pin, bolt, screw, or the like.

The link attachment assembly 34 pivotally connects the main body 28 to the link assembly 26. The link attachment assembly 34 may be a clevis, lug, ball joint, rod end, or the like, that may be secured to a flange or other attachment point of the aircraft engine 12 with a fastener 58, such as a pin, bolt, screw, or the like.

The link assembly 26 is an elongated structure with a proximal attachment element 60 for attaching to the link attachment assembly 34 and a distal attachment element 62 at its opposite end for attaching to a flange, clevis, or the like on the aircraft engine 20. The link assembly 26 facilitates thermal expansion of the aircraft engine 12 by rotating about fastener 58 and thereby allowing a diameter of aircraft engine 12 to change slightly without exerting undue force on the forward mount assembly 18 or the aircraft engine 12. The proximal and distal attachment elements 60, 62 may each be a clevis, lug, ball joint, rod end, combinations thereof, or other the like. The proximal attachment element 60 is secured within the link attachment assembly 34 with a fastener 58, such as pins, lugs, bolts, or the like. Similarly, the distal attachment element 62 is secured to a flange or other attachment point of the aircraft engine 12 with a fastener 64, such as pins, lugs, bolts, or the like. In some embodiments, the proximal and distal attachment elements 60, 62 are identical to facilitate easy assembly, disassembly, and maintenance of the aircraft engine mounting apparatus 10. In some embodiments, the distal attachment element 62 is a lug and the lower attachment assembly 32 is a clevis to prevent the forward mount assembly 18 from being installed on the aircraft engine 12 in an inverted fashion. In some embodiments, the length of the link assembly 26 may be adjustable, like a turnbuckle, to facilitate different aircraft engines, engineering tolerances, or the like. In yet other embodiments, the link assembly 26 may be omitted entirely and the link attachment assembly 34 is directly attached to the flange or other attachment point of the aircraft engine 12.

Turning now to FIGS. 2, 3, 5A, 5B, and 6, the thrust assembly 20 will be described in more detail. The thrust assembly 20 connects the forward mount assembly 18 to the aft mount assembly 22 and includes a thrust fitting assembly 66 and a thrust link assembly 68.

Figures 5A, 5B:
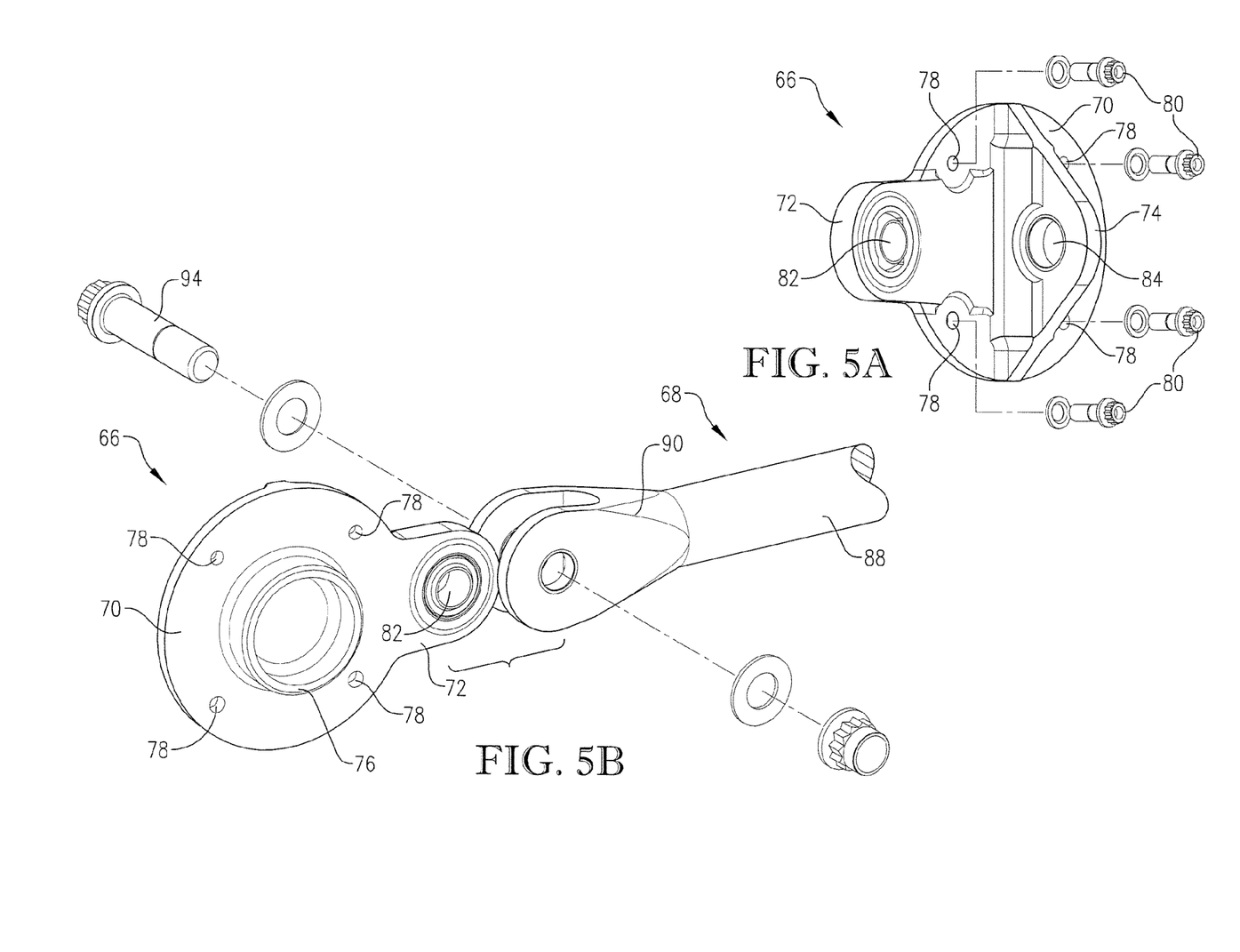
FIG. 5A is an isometric view of the thrust-fitting flange side of the thrust fitting assembly.
FIG. 5B is an isometric view of the aircraft engine side of the thrust fitting assembly.

As best shown in FIGS. 2, 5A and 5B, the thrust fitting assembly 66 includes a base member 70, a thrust link tongue 72, a thrust-fitting flange 74, and an engine flange 76. The base member 70 is generally planar with holes 78 for securing the thrust fitting assembly 66 to the aircraft engine 12 with a fastener 80, such as screws, bolts, or the like. The thrust link tongue 72 may extend from the base member 70 at a peripheral edge of the base member 70 and has a pin-receiving hole 82 therethrough for securely attaching to the thrust link assembly 68, as described below. The thrust-fitting flange 74 is generally planar with a pin-receiving hole 84 therethrough, and having a thickness generally less than the channel 40 of the forward mounting assembly 18. The thrust-fitting flange 74 may extend generally perpendicular from the base member 70. The engine flange 76 extends from the base member 70 for matingly engaging a flange or other surface feature of the aircraft engine 12 and may additionally include various protrusions or depressions. In some embodiments the thrust link tongue 72, the thrust-fitting flange 74, and the engine flange 76 may be integrally formed with the base member 70 such that these components constitute a unitary whole. Alternatively, in some embodiments, one or more of the components may be separately formed and secured to the base member 70 with welds, bolts, screws, adhesive, or other conventional attachment methods. The thrust-fitting flange 74 may be positioned within the channel 40 of the forward mounting assembly 18 and secured with a fastener 86 inserted through the pin-receiving hole 84 of the thrust-fitting flange 74. The fastener 86 may be a screw, a bolt, a pin, or the like. In this configuration, the thrust fitting assembly 66 may be operable to slide relative to the forward mounting assembly 18 back and forth axially along the fastener 86 and may be operable to partially pivot around the fastener 86.

Figure 6:
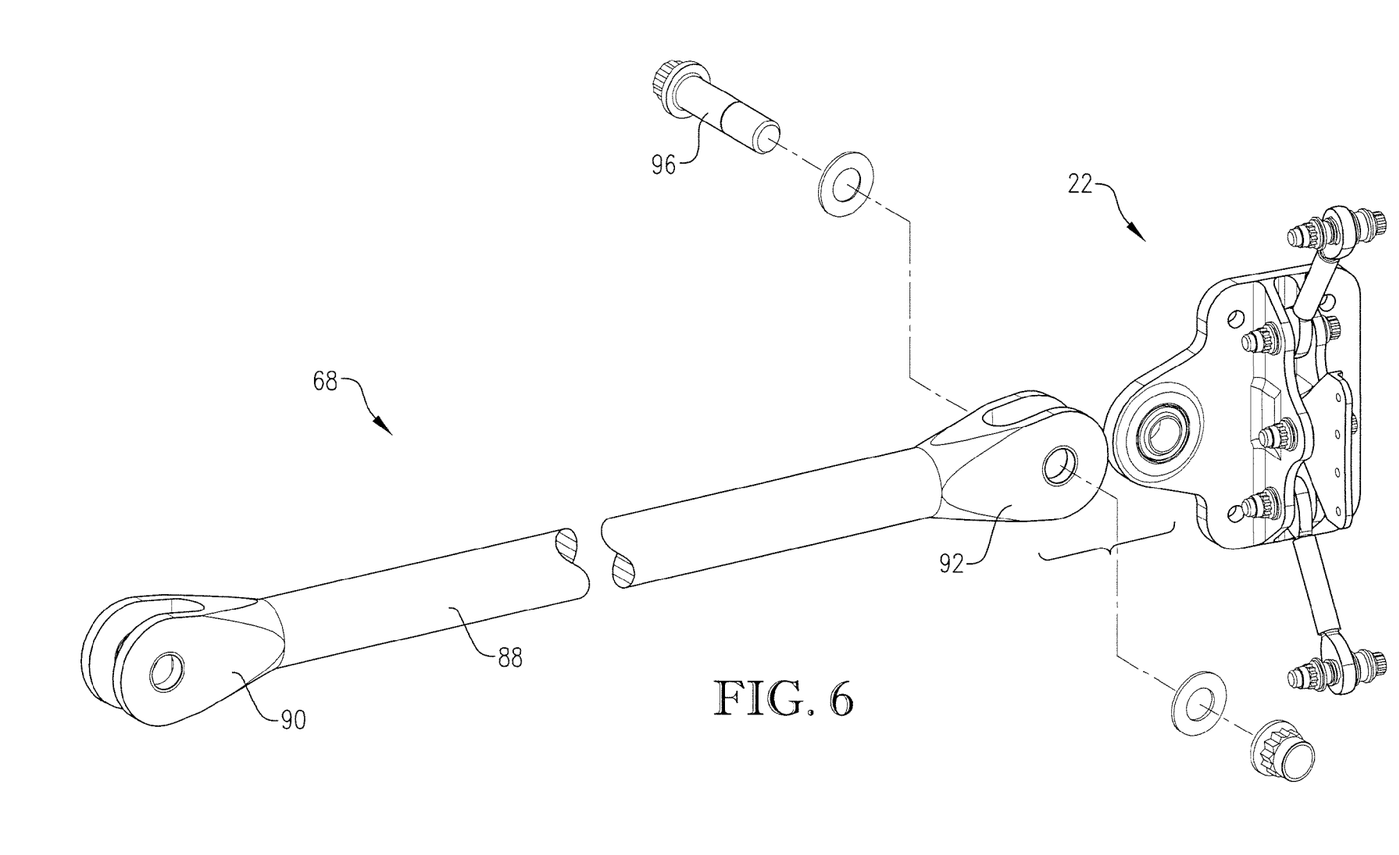
FIG. 6 is an isometric view of the thrust link assembly.

Turning to FIGS. 2, 3 and 6, the thrust link assembly 68 includes an elongated bar 88 with a thrust-fitting attachment assembly 90 and an aft-mount attachment assembly 92 on its distal ends for securing the thrust fitting assembly 66 to the aft mounting assembly 22. The thrust-fitting attachment assembly 90 may be a clevis, lug, ball joint, rod end, or the like, and enables the thrust link assembly 68 to be pivotally secured to the thrust link tongue 72 through pin-receiving hole 82 when attached with a fastener 94, such as a pin, a screw, a bolt, or the like. Similarly, the aft-mount attachment assembly 92 may be a clevis, lug, ball joint, rod end, or the like, and enables the thrust link assembly 68 to be pivotally secured to the aft mount assembly 22 when attached with a fastener 96, such as a pin, a screw, a bolt, or the like.

Figure 7:
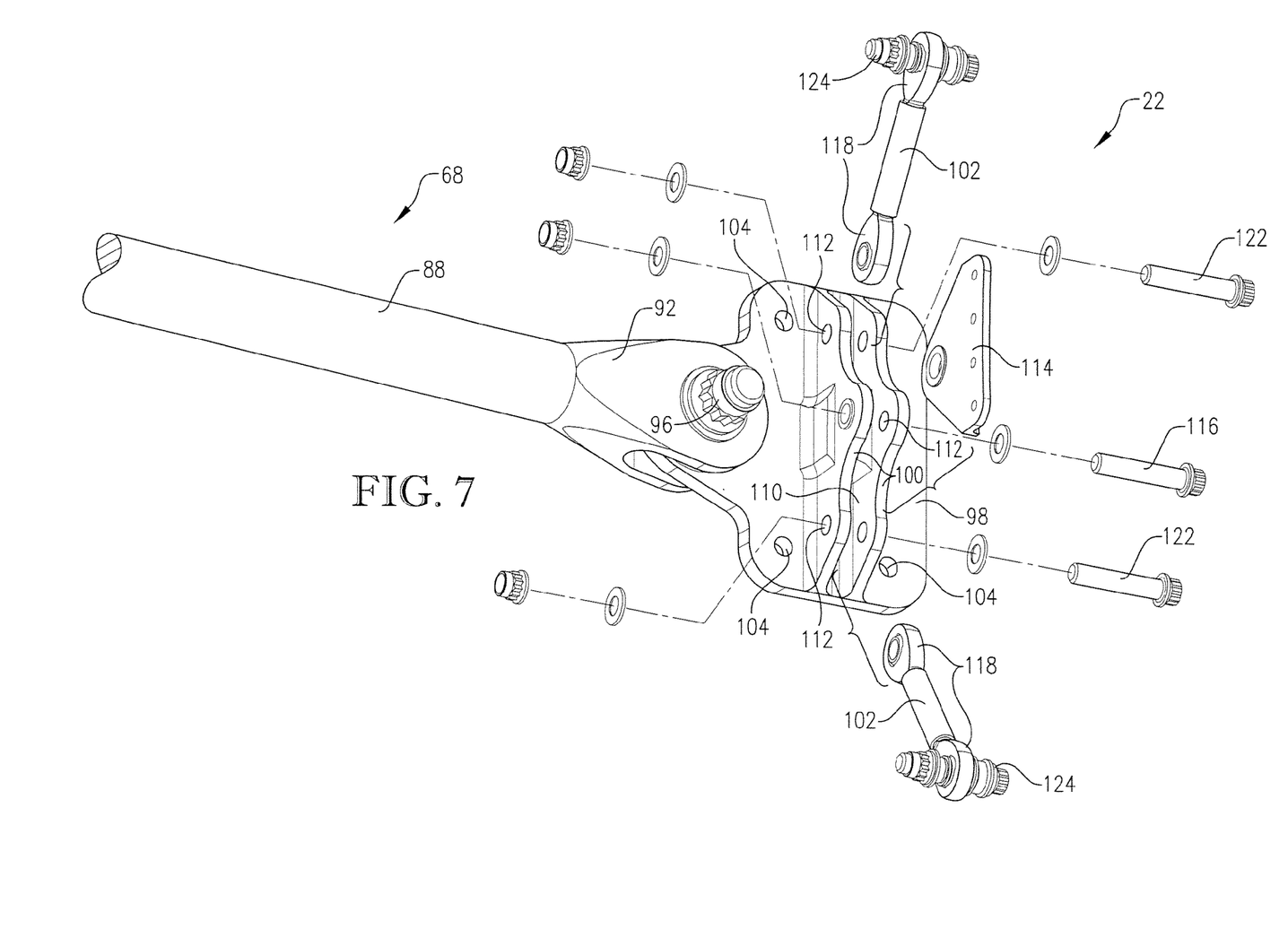
FIG. 7 is an isometric view of the aft mount assembly.

Turning now to FIGS. 2, 3 and 7, the aft mount assembly 22 includes a base member 98, flanges 100, and a pair of engine-link assemblies 102.

In one embodiment, the base member 98 is rectangular and generally planar and may include a plurality of fastener holes 104 for securing the aft mount assembly 22 to the pylon 14 with a fastener (not shown), such as screws, bolts, pins, or the like. In some embodiments, the base member 98 may be circular, square, or any other shape, and, in various embodiments, may include reinforcement members to strengthen or stiffen the base member 98. Additionally, the base member 98 may include various protrusions, depressions, or the like, such as pin 108, operable to matingly engage with various complimentary features of the pylon 14.

Each flange 100 extends generally perpendicular from the base member 98 and is spaced-apart from each adjacent flange 100 to define a channel 110 therebetween, like a clevis. Each flange 100 is generally planar and includes a plurality of pin-receiving holes 112 for securing a flange 114, or other attachment point of the aircraft engine 12 therein with a fastener 116, such as pins, lugs, bolts, or the like. In this embodiment, the aft mount assembly 22 includes two flanges 100, but in some embodiments more or fewer flanges could be used. In some embodiments each flange 100 is separately manufactured and secured to the base member 98 with welds, adhesive, or the like. In other embodiments, the base member 98 and each flange 100 may be constructed as a single piece without the need for welds, or the like.

Each engine-link assembly 102 is an elongated structure with attachment elements 118 at its distal ends for attaching the aft mount assembly 22 to a flange or other feature 120 of the aircraft engine 12. Each attachment element 118 may be a clevis, lug, ball joint, rod end, or other attachment device. Various combinations of devices may be used for each attachment element 118. At the proximal end of the engine-link assembly 102, each attachment element 118 is secured between each adjacent flange 100 with a fastener 122, such as pins, lugs, bolts, or the like, and, at the distal end of the engine-link assembly 102, each attachment element 118 is secured to the feature 120 of the aircraft engine 12 with a fastener 124, such as pins, lugs, bolts, or the like. In some embodiments, each attachment element 118 is identical to facilitate easy assembly, disassembly, and maintenance of the aircraft mounting apparatus 10 and, in some embodiments, each attachment element 118 may be different. In other embodiments, the length of the engine-link assembly 102 may be adjustable, like a turnbuckle, to facilitate different aircraft engines, engineering tolerances, or the like.

In use, the aircraft engine mounting apparatus 10 continues to provide safe operation of the aircraft engine 12 and transmit the thrust of the aircraft engine 12 to the pylon 14 even if portions of the aircraft engine mounting apparatus 10 fail.

If a failure occurs in lower attachment assembly 32, the main body 28 will rotate generally about the fastener 58 of the link assembly 26 and cause walls of the pin-receiving hole 84 of the thrust-fitting flange 74 to engage the fastener 86. Thus, the load normally carried by the lower attachment assembly 32 is transferred to the thrust fitting assembly 66. Furthermore, in a forward mount failure condition, the engine 12 may shift slightly until the hole 84 bottoms-out or walls of the hole 84 contact the fastener 86, establishing an alternate fail-safe load path. However, in normal operation, the fastener 86 may have clearance through the hole 84 and may not support a load thereon.

If a failure occurs in the link assembly 26, the main body 28 will rotate generally about the fastener 56 of the lower attachment assembly 32 and cause walls of the pin-receiving hole 84 of the thrust-fitting flange 74 to engage the fastener 86. Thus, the load normally carried by the link assembly 26, the fastener 58, and the fastener 64 is transferred to the thrust fitting assembly 66.

If a failure occurs in the thrust link assembly 68, the aircraft engine 12 will translate forward and cause the main body 28 to engage the thrust-fitting flange 74 within the channel 40. Similarly, the engine feature 114 will translate forward between the flanges 100 of the aft mount assembly 22 which have been configured to not engage should a thrust link assembly 68 failure occur. Thus, the load normally carried by the thrust link assembly 68 is carried by the forward mount assembly 18 through the channel 40.

Fastener 116 is normally supported by pin receiving holes 112 in flanges 100 without vibration. If a failure occurs in either engine-link assembly 102, the aft mount assembly 22 will rotate about the non-failing engine-link assembly 102 and cause the fastener 116 to engage walls of the pin-receiving hole in mounting flange 114. In other words, upon failure of either link 102, the fastener 116 may bottom-out in the pin-receiving hole of the mounting flange 114. Thus, the load normally carried by the failed engine-link assembly 102 is transferred to the mounting flange 114.

Figure 8:
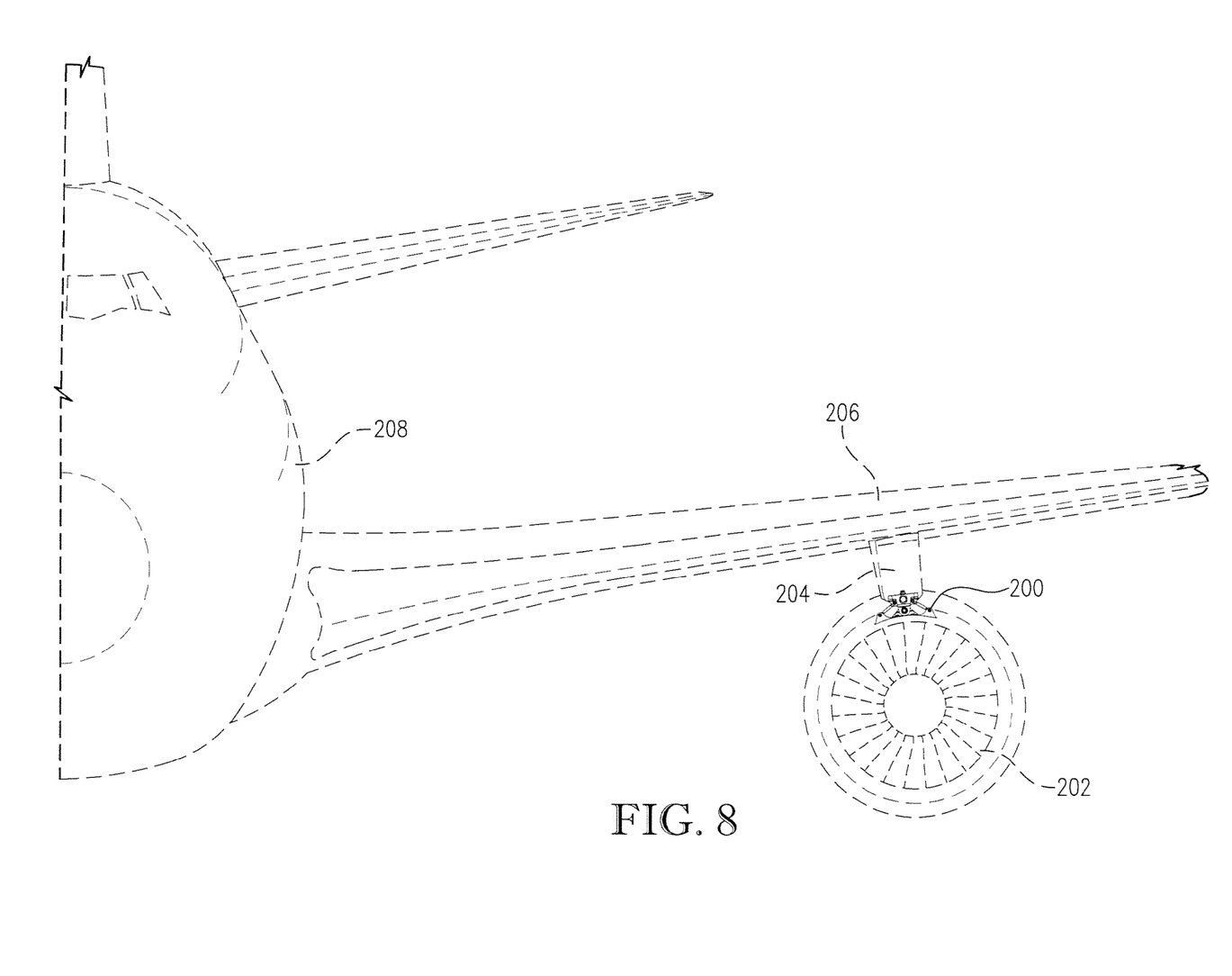
FIG. 8 is an elevation view of an aircraft engine mounting apparatus installed under a wing of an aircraft in accordance with another embodiment of the present invention.
Figure 9:
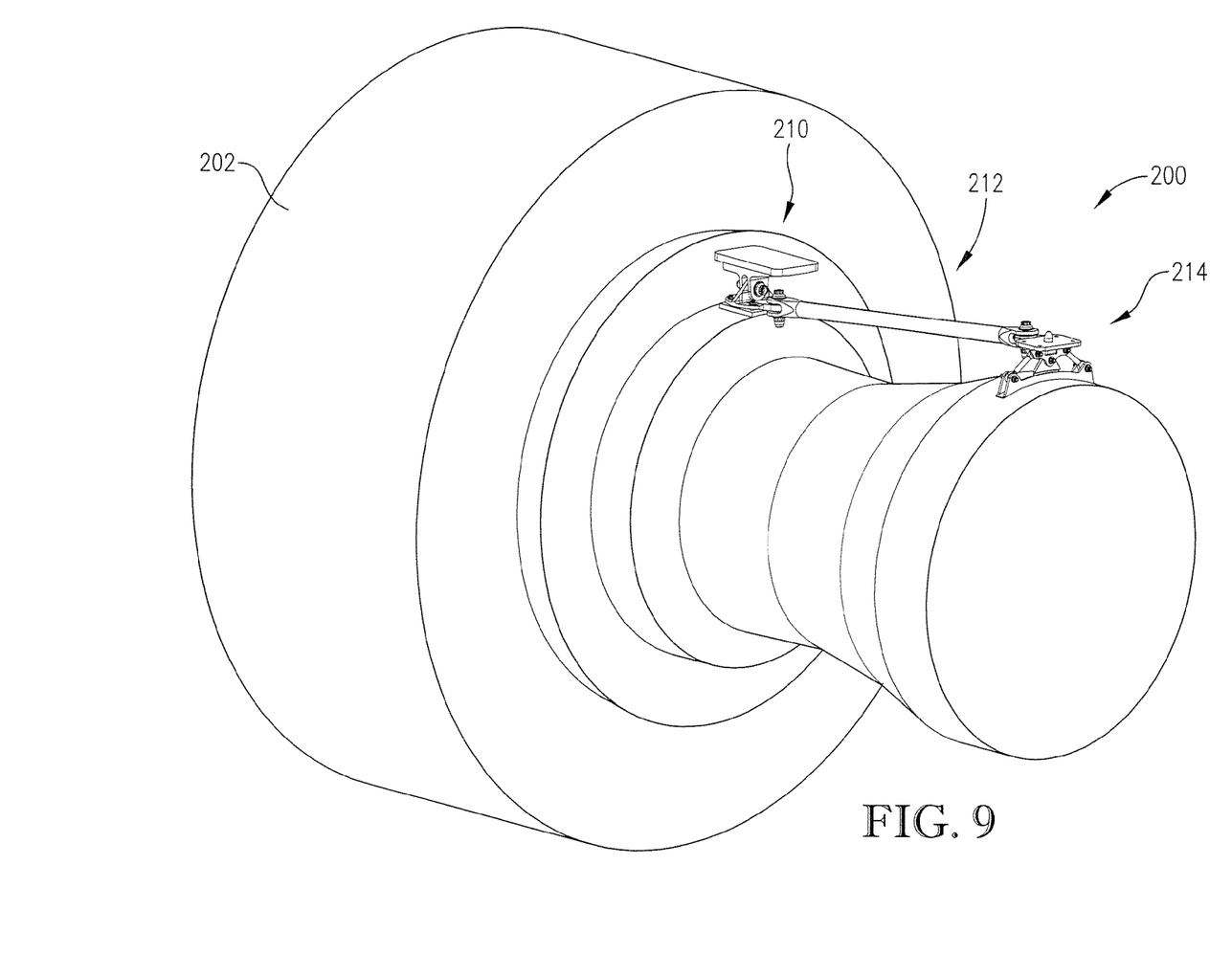
FIG. 9 is an isometric view of the aircraft engine mounting apparatus of FIG. 8 attached to an aircraft engine.
Figure 10:
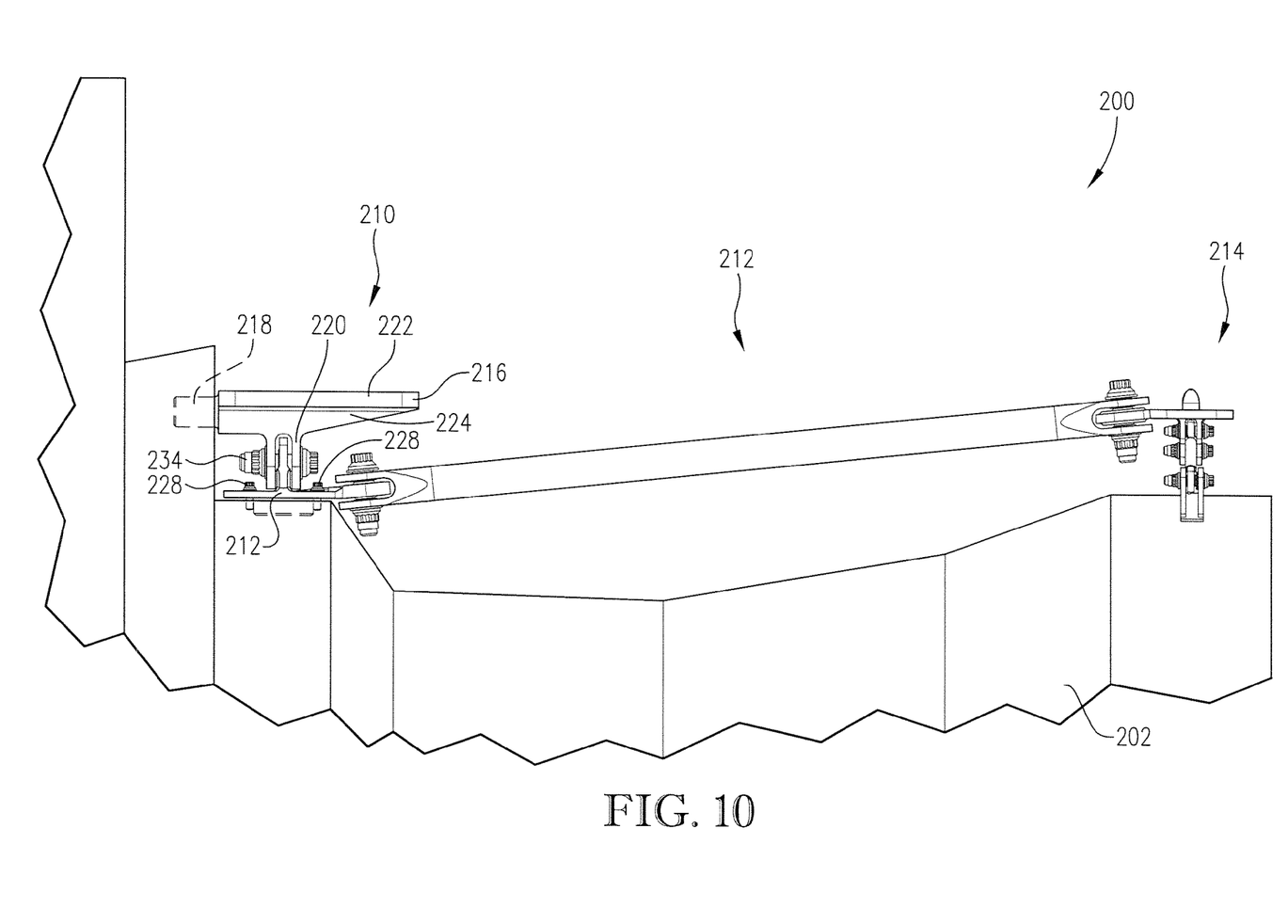
FIG. 10 is an elevation view of the aircraft engine mounting apparatus of FIG. 8.

Turning now to FIGS. 8-10, another embodiment of an aircraft engine mounting apparatus 200 is illustrated. This embodiment is substantially similar to the mounting apparatus 10 of FIGS. 1-7, except where indicated.

In this embodiment, the aircraft mounting apparatus 200 attaches an aircraft engine 202 to a pylon 204 located under a wing 206 of an aircraft 208 and broadly includes a forward mount assembly 210, a thrust assembly 212, and an aft mount assembly 214.

The forward mount assembly 210 includes a main body 216, a pin 218 extending longitudinally from an end of the main body 216, and a clevis 220 extending from the main body 216 generally perpendicular to the pin 218. The main body 216 includes a generally planar base member 222 and a longitudinal raised knuckle 224 and provides a secure location to connect the forward mount assembly 210 to the pylon 204. The base member 222 may include a plurality of holes (not shown) therethrough, similar to the holes 50 of FIGS. 2 and 3, to secure the pylon to the main body 216 with a fastener (not shown), such as screws, bolts, pins, or the like. The pin 218 transmits load forces between the aircraft engine 202 and the forward mount assembly 210 and extends longitudinally from an end of the main body 216. The clevis 220 extends from the raised knuckle 224 at an angle generally perpendicular to the base member 222 to engage the thrust assembly 212 using one or more fasteners 228, such as screws, bolts, pins, or the like. The clevis 220 contains a pin-receiving hole (not shown) for securing the thrust assembly 212 therein with a fastener 234, such as screws, bolts, pins, or the like.

The thrust assembly 212 and aft mount assembly 214 are substantially similar to the thrust assembly 20 and aft mount assembly 22 of FIGS. 1-7, respectively.

The above described embodiments of an aircraft engine mounting apparatus provide numerous advantages over prior aircraft engine mounting apparatus. For example, the aircraft engine mounting apparatus provides for redundancy of each portion of the apparatus. Thus, if any portion of the aircraft engine mounting apparatus cannot provide the proper load path, either by failure or omission, embodiments of the present invention provide for continued safe operation of the aircraft engine.

Additionally, because the aircraft engine mounting apparatus is part of a primary load path, it adds less weight than other fail-safe mounting apparatuses.

The aircraft engine mounting apparatus also uses a single fitting to accomplish both fail-safety and to transmit the thrust load path. Thus, the apparatus is simpler, less prone to failure, and easier to assemble than other prior art assemblies.

The aircraft engine mounting apparatus may be attached to a right or a left side of the aircraft by simply rearranging the parts. Thus, by allowing the same parts to function on the left or right side of the aircraft, the aircraft engine mounting apparatus reduces errors caused by misplacement of parts that can occur when parts are specifically designed for the left side or the right side of the aircraft.

Additionally, embodiments of the aircraft engine mounting apparatus are self-supporting and not prone to damage when not installed on the aircraft.

Although the invention has been described with reference to the preferred embodiment illustrated in the attached drawing figures, it is noted that equivalents may be employed and substitutions made herein without departing from the scope of the invention as recited in the claims. Specifically, the configurations described herein disclose attaching the thrust link assembly 68 to the aft mount assembly 22. However, an aft end of the thrust link assembly 68 may be separately attached to a third point on the pylon 14 spaced apart from the aft mount assembly 22. For example, the aft mount assembly 22 may be omitted entirely and/or may be a basic mechanical connector of any type for attaching the thrust link assembly 68 to the pylon 14.

Having thus described the preferred embodiment of the invention, what is claimed as new and desired to be protected by Letters Patent includes the following:

1. A mounting apparatus for an aircraft engine that provides load path redundancy, the mounting apparatus comprising:
   a forward mount for attaching the aircraft engine to a pylon at a forward position of the aircraft engine, the forward mount including an aircraft engine attachment assembly and a fail-safe assembly;
   an aft mount for attaching the aircraft engine to the pylon at an aft position of the aircraft engine; and
   a thrust assembly connected with the forward mount, wherein the thrust assembly is configured to attach with the pylon at an aft position, to attach to the aircraft engine, and to constrain relative movement between the forward mount and the thrust assembly in an inward and outward direction toward and away from a rotational axis of the aircraft engine and in a forward and aft direction relative to the aircraft engine.

2. The mounting assembly of claim 1, wherein the fail-safe assembly of the forward mount further comprises a pair of spaced-apart walls defining a channel and a pin-receiving hole.

3. The mounting apparatus of claim 2, wherein the thrust assembly further comprises a thrust fitting assembly including a pin-receiving hole and a forward mounting flange, the forward mounting flange positioned within the spaced-apart channel of the forward mount and having a pin-receiving hole axially aligned with the pin-receiving hole of the forward mount assembly.

4. The mounting apparatus of claim 3, further comprising a fastener disposed within the pin-receiving hole of the thrust fitting assembly and the pin-receiving hole of the forward mount.

5. The mounting apparatus of claim 2, wherein the axis of the pin-receiving hole is generally parallel with the major axis of the aircraft engine.

6. The mounting apparatus of claim 1, wherein the fail-safe assembly of the forward mount further comprises a pair of spaced-apart flanges wherein the spaced-apart flanges each have a pin-receiving hole.

7. The mounting apparatus of claim 1, wherein the aft mount further comprises a fail-safe assembly including two upstanding spaced-apart flanges defining a channel and mounting tongue, each of the flanges including an axially-aligned pin-receiving hole and the mounting tongue including a pin-receiving hole.

8. The mounting apparatus of claim 7, wherein the thrust assembly further comprises an elongated thrust link assembly having a pin-receiving hole at an end, the pin-receiving hole axially aligned with the pin receiving hole of the mounting tongue.

9. The mounting apparatus of claim 8, wherein the aft mount and the link assembly are symmetric about an axis parallel with the major axis of the aircraft engine and the forward mount is symmetric about an axis transverse to the major axis of the aircraft engine.

10. The mounting apparatus of claim 1, wherein the aircraft engine attachment assembly of the forward mount comprises a clevis, lug, ball joint, or rod end.

11. The mounting apparatus of claim 1, wherein the aft mount further comprises an aircraft engine attachment assembly including a clevis, lug, ball joint, or rod end.

12. A mounting apparatus for an aircraft engine that provides load path redundancy, the mounting apparatus comprising:
   a forward mount assembly operable to attach to the aircraft engine and a pylon and including spaced-apart walls defining a channel, each wall including a pin-receiving hole;
   a thrust fitting assembly configured to be positioned between the forward mount and the aircraft engine, the thrust fitting assembly including a pin-receiving hole and a forward mounting flange, the forward mounting flange positioned within the spaced-apart channel of the forward mount assembly and having a pin-receiving hole axially aligned with the pin-receiving hole of the forward mount assembly;
   a first fastener for securing the thrust fitting assembly in the forward mount assembly and positioned within the pin-receiving holes of the forward mount assembly and the pin-receiving hole of the forward mounting flange;
   a thrust link assembly pivotally connected to the thrust fitting assembly at a first end of the thrust link assembly; and an aft mount assembly operable to attach to the aircraft engine and pivotally connected to the thrust link assembly at a second end of the thrust link assembly with a second fastener, the aft mount assembly including two upstanding spaced-apart flanges defining a channel, each of the upstanding flanges having an axially-aligned pin-receiving hole.

13. The mounting apparatus of claim 12, wherein the forward mounting assembly further comprises:
an elongated arcuate yoke assembly; and
a forward mounting link assembly.

14. The mounting apparatus of claim 12, wherein the first fastener is a bolt, a pin, a lug, or a screw.

15. The mounting apparatus of claim 12, wherein the second fastener is a bolt, a pin, a lug, or a screw.

16. The mounting apparatus of claim 12, wherein the thrust link assembly includes a clevis, lug, ball joint, or rod end at the first and second ends.

17. The mounting apparatus of claim 12, wherein the forward mount assembly further comprises a plurality of attachment points for the aircraft engine.

18. The mounting apparatus of claim 12, wherein the aft mount assembly further comprises a plurality of attachment points for the aircraft engine.

19. The mounting apparatus of claim 12, wherein the forward mount assembly is symmetric about a vertical axis.

20. The mounting apparatus of claim 12, wherein the aft mount assembly is symmetric about a horizontal axis.

* * * * *